Figure 1:
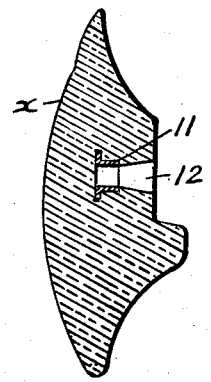

Aug. 15, 1939  G. M. LEASE  2,169,731
PIN FOR ARTIFICIAL TEETH AND METHOD OF MAKING SAME
Filed July 14, 1938

INVENTOR
GLEN M. LEASE
BY
ATTORNEY

Patented Aug. 15, 1939

2,169,731

UNITED STATES PATENT OFFICE 2,169,731

PIN FOR ARTIFICIAL TEETH AND METHOD OF MAKING SAME

Glen M. Lease, York, Pa., assignor to The Dentists' Supply Company of New York, New York, N. Y., a corporation of New York Application July 14, 1938, Serial No. 219,121

4 Claims. (Cl. 29—160.6)

This invention relates to artificial teeth, and has particular reference to the pins connected therewith, which are used as a means for holding the artificial teeth on the denture base material. The alleged invention herein described is an improvement over the invention described and claimed in United States Patent No. 1,821,301, granted September 1, 1931, in which, after many experiments, it was determined that the features disclosed in said patent were impracticable, and the subject-matter thereof abandoned.

It is customary in the manufacture of artificial teeth, and has been the practice for many years, to first insert a small ferrule or coil of metal, such as platinum, which has a high fusing point, so that upon the firing of the artificial tooth, the coil will remain intact. To this coil a pin is connected, which said pin is customarily provided with a head for anchoring the artificial tooth in the denture base material.

The usual practice heretofore for attaching the pin to the coil was as follows: A hand tool in the shape of a blunt needle was dipped into liquid flux, then touched to a round disk of solder. The solder was attracted to the blunt needle by the adhesiveness of the liquid flux, and this solder was then carried into the tooth cavity by means of the blunt needle and deposited in the coil. After this, a pin was picked up with tweezers and placed on top of the solder disk in the cavity. The tooth was then placed in a soldering furnace where the solder was fused to firmly unite the pin with the coil. In this operation, it often happened that the liquid flux touched the back of the tooth, and might be transferred to the sides or face of the tooth, so that when the tooth was put into the soldering furnace, the flux would cause a blemish on the tooth, and for this reason, the tooth would probably be rejected. It will also be apparent that with this old method of attaching pins, two distinct operations were necessary in placing the solder and pin in the tooth.

The object of the present invention is to provide pins with solder attached, so as to limit the insertion of same into the tooth to one operation.

A further object of the invention is to eliminate any likelihood of marring the teeth by the use of liquid flux.

A further object of the invention is to provide solder units which may be quickly and conveniently attached to the blunt end of the pin, so as to remain connected therewith.

According to the invention the artificial tooth pin having a blunt end is provided with a block of solder abutting said blunt end, said block being provided with extending wings folded against tht side of said pin, and swaged thereto. The solder unit may be cut in sections from a ribbon and the flux applied thereto in a preliminary operation, after which either the solder unit or the pins with solder attached may be dried, so that the flux is present as a dry film or skin over either the solder unit or over the entire solder unit and pin.

Figure 2:
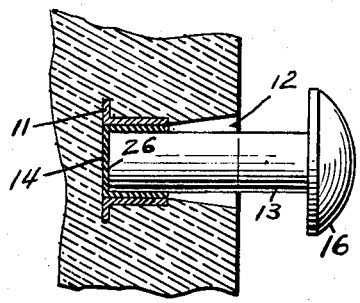
Figure 3:
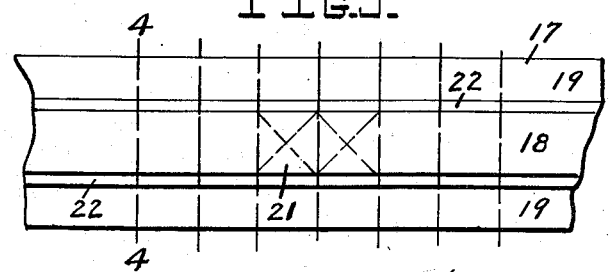
Figure 4:
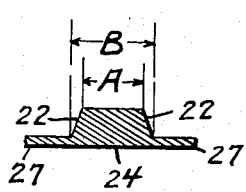
Figure 5:
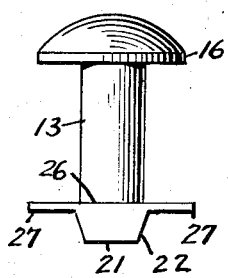
Figure 6:
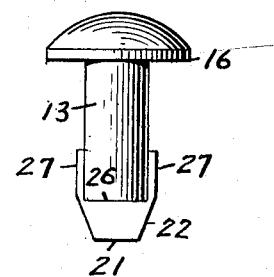
Figure 7:
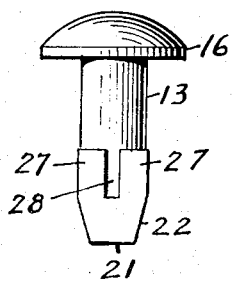
Figure 8:
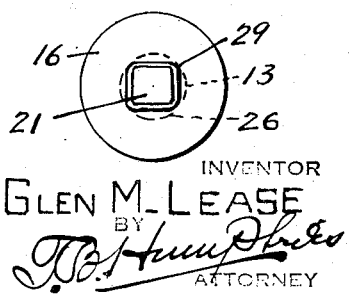

The drawing illustrates an embodiment of the invention and the views therein are as follows:

Figure 1 is a vertical sectional view of an artificial tooth showing the coil therein, Figure 2 is an enlarged fragmentary vertical section showing a pin connected with the coil, Figure 3 is a top plan view of a piece of the ribbon employed for the solder units, Figure 4 is a cross sectional view taken on the line 4—4 of Figure 3, Figure 5 is an enlarged side elevation of a dental pin showing the solder unit in position to be attached thereto, Figure 6 is a similar view showing the side wings of the solder unit folded against the side of the pin, Figure 7 is a like view after the solder wings have been swaged to the side of the pin, and Figure 8 is a bottom plan view of the finished article showing the rounding of the corners of the solder block.

In the drawing, the tooth X has the coil 11 connected therewith prior to the firing of said tooth, so that when the tooth is taken from the furnace, it is located as shown in this figure with the opening 12 through which a pin is to be extended for connection with said coil. This pin may be of varying length. In the fragmentary view shown in Figure 2, the pin 13 has connected to the coil 11 by means of the solder 14. The pin may be provided with a head 16 for better anchorage of the tooth in the denture base material.

In Figure 3 I have shown a short piece of solder ribbon 17 which has a central longitudinal rib 18 and longitudinal side flanges 19. This ribbon may be rolled, drawn or extruded, as desired.

The ribbon is cut into sections, as indicated by the dotted lines in Figure 3, so that the block 21 will have its outer face, indicated by the crossed dotted lines, substantially square.

In Figure 4 showing a section cut from the ribbon 17 of Figure 3, the dimension A is usually a few thousandths less than the dimension B, that is to say, the side walls 22 of the block 21 are slightly tapered.

In Figure 5, the solder unit 24 has been inverted and the block 21 abuts the blunt end 26 of the pin 13, while the side wings 27 extend outward diametrically therefrom.

In Figure 6, the side wings 27 have been folded against the side of the pin 13, while, in Figure 7, these side wings 27 have been swaged to the side of the pin, leaving a space 28 between the ends thereof. In this same operation, the solder block 21 has its corners rounded as at 29, so that the pin with solder attached is readily inserted in the opening 12 (see Figure 1) and with the solder block resting within the coil 11. Prior, however, to the insertion of the pin with solder attached into the tooth X of Figure 1, each of the units 24, or the pin with solder attached, as shown in Figure 7, may have flux applied thereto as a preliminary operation, after which the flux is dried and thereafter is present as a dry skin or film over the entire solder unit or over the entire pin and unit combined, as desired.

The present method calls for one operation in inserting the pin, solder and flux into the tooth, whereas no method heretofore suggested has been practicable for eliminating the necessity for two operations to accomplish the same thing.

It will be noted from Figure 7 that the diameter through the wings is only slightly greater than the diameter of the pin body, the solder wings themselves being actually swaged into the pin body. This difference in diameter is ordinarily, in practice, only approximately one thousandth of an inch.

Of course, the tooth pin with solder attached illustrated and described herein may be modified in various ways without departing from the invention herein set forth and hereafter claimed.

The invention is hereby claimed as follows:

1. The method of providing a dental pin with solder for connecting same in an artificial tooth, comprising the steps of providing a block of solder with integral side wings, then abutting the end of the pin with said block, then folding said wings against the side surface of said pin, and then swaging said wings into said pin body.

2. The method of providing a dental pin with solder for connecting same in an artificial tooth, comprising the steps of providing a block of solder with diametrically opposite integral side wings, then abutting the end of the pin with said block, then folding said wings against the side surface of said pin, and then swaging said wings to partially surround said pin, said wings being pressed into said pin body to such an extent that the finished diameter through said wings is substantially equal to the original diameter of said pin.

3. A pin for artificial teeth having a block of solder extending from the end thereof, said block having integral wings extending parallel with the pin and embedded into the side surface thereof to such extent that the finished diameter through said wings is substantially equal to the original diameter of said pin.

4. A pin for artificial teeth having a block of solder abutting the end thereof, said block having integral wings extending against the side of said pin and swaged therein to such an extent that not more than one-half of the thickness of the solder lies outside the original diameter of the pin.

GLEN M. LEASE.